(No Model.) 2 Sheets—Sheet 1.
G. D. BURTON.
STOCK CAR.
No. 414,014. Patented Oct. 29, 1889.
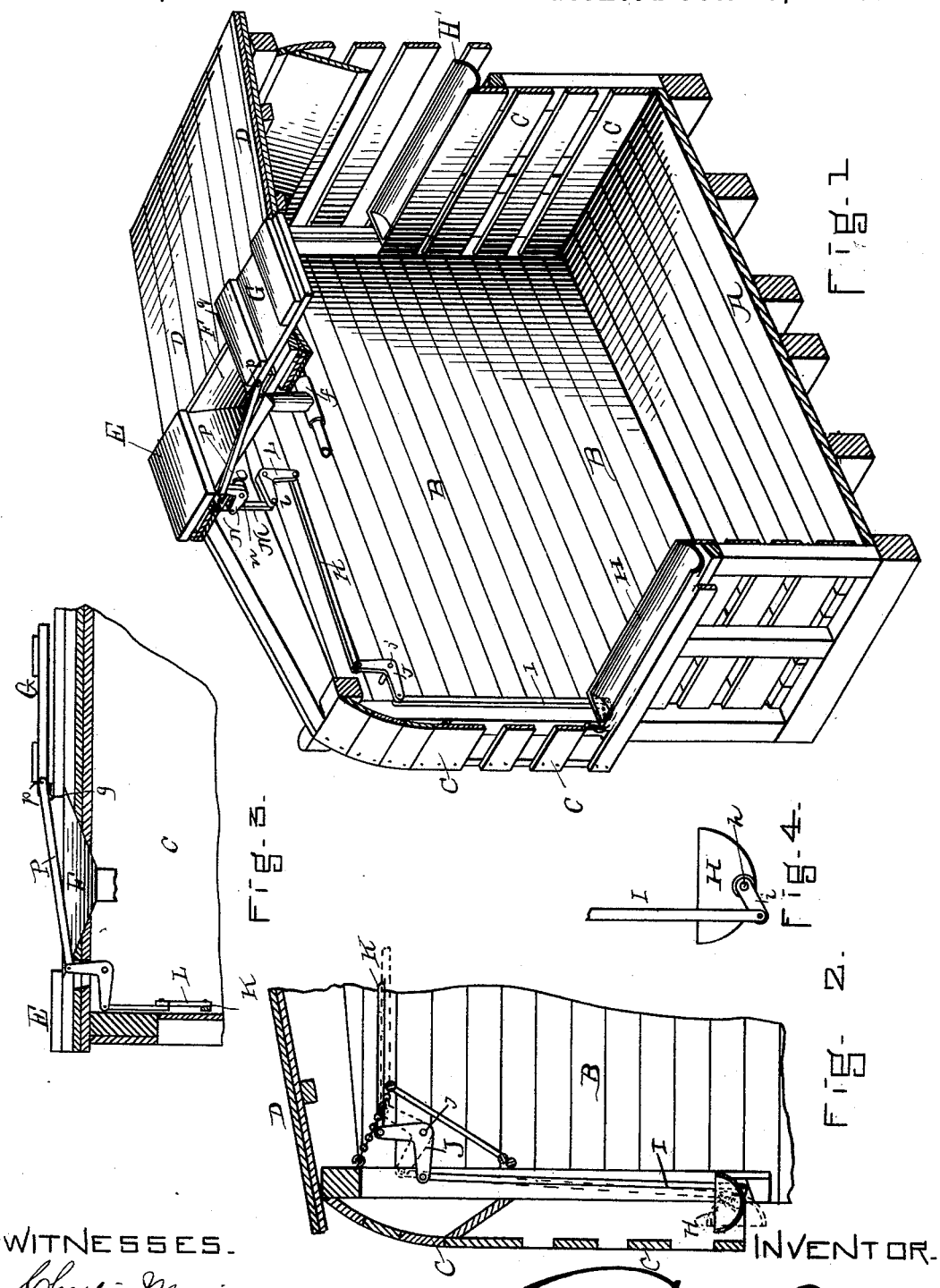
WITNESSES.
Chester Mann
George H. Kimball
INVENTOR.
Geo. D. Burton (No Model.) 2 Sheets—Sheet 2.
G. D. BURTON.
STOCK CAR.
No. 414,014. Patented Oct. 29, 1889.
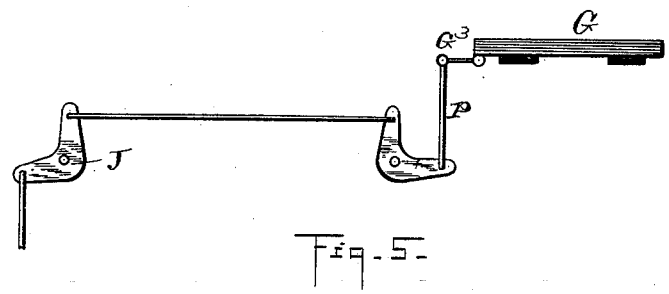
Fig. 5.
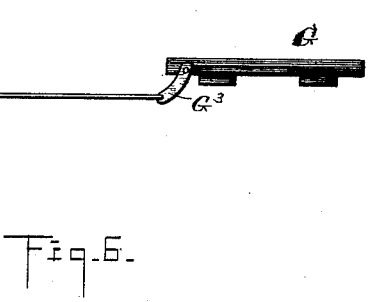
Fig. 6.
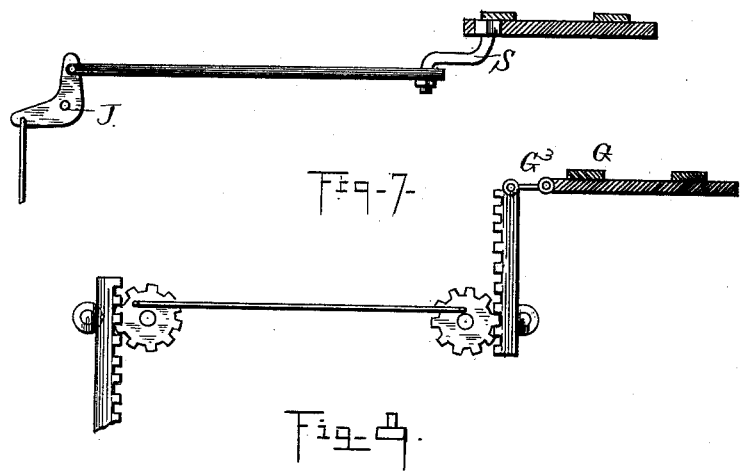
Fig. 7.
Fig. 4.
Witnesses
Will E. Aughinbaugh
M. A. Douglas
Inventor
Geo. D. Burton
By his Attorneys
Foote & Brashears

UNITED STATES PATENT OFFICE.

GEORGE D. BURTON, OF BOSTON, MASSACHUSETTS.

STOCK-CAR.

SPECIFICATION forming part of Letters Patent No. 414,014, dated October 29, 1889.

Application filed June 14, 1889. Serial No. 314,277. (No model.)

*To all whom it may concern:*

Be it known that I, GEORGE D. BURTON, a citizen of the United States, residing at Boston, in the county of Suffolk and State of Massachusetts, have invented certain new and useful Improvements in Stock-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to stock-cars, and especially to the mechanism for dumping the feed-troughs thereof.

In stock-cars it is advisable to always promptly dump the feed-trough after use, for several reasons. If the troughs are allowed to stand upright with wet food or water in them, they will soon rust, and in winter the small residue left after feeding will freeze therein, thus clogging them up. It is further desirable that they should be promptly dumped, for the reason that in many improved stock-cars the troughs serve in their dumped positions to partially or wholly close openings in the side of the car, and in some cases they are in the way when in upright position, projecting inside the car, but are not so when dumped.

My invention consists in mechanism whereby the troughs are so connected to the trap-doors which cover the water-tanks that the openings of said traps for any purpose—such as to receive water from the roadside cranes—will bring the troughs into their upright positions, and the closing of such traps will dump the troughs.

In the accompanying drawings, Figure 1 is a view in perspective of so much of the interior and exterior of a car as is necessary to illustrate my invention. Fig. 2 is a fragmentary transverse sectional view showing the troughs and a part of the dumping mechanism. Fig. 3 is a fragmentary longitudinal section showing the upper part of the dumping mechanism in continuation of that shown in Fig. 2, and its connection with the traps of the water-tanks. Fig. 4 is a detail view showing the troughs in end elevation and the connection thereto of the dumping-lever. Figs. 5 and 6 are views of modifications in which the trap-door in the walking-plank is made to open transversely of the car instead of longitudinally. Fig. 7 is a view of a modification in which the trap-door is mounted on a vertical pivot and made to swing around horizontally. Fig. 8 is a view of a modification in which gears and levers are substituted for most of the bell-cranks or elbow-levers and rods used in the other modifications.

Like letters of reference mark the same parts wherever they occur in the various figures of the drawings.

Referring to the drawings by letters, A is the floor, B an end, C C sides, D the roof, E the walking-plank, F the water-tank, *f* the distributing-pipes, G the trap-door closing the water-tanks, and H the feed-trough, of a car. All these may be of any ordinary or preferred construction.

The trough H is pivoted, as at *h*, so that it will dump outwardly. It has secured to its pivot a crank-arm *i*, to which is connected a rod I. This rod at its upper end connects to the end of the horizontal arm of an elbow-lever J, pivoted at *j* to the end B of the car. To the upright arm of this elbow-lever J is attached a rod K, extending in substantially a horizontal line along the end of the car, and attached at its opposite end to the downward-projecting vertical arm of an elbow-lever L, pivoted at *l* to the end of the car, near the center. The horizontal arm of this elbow-lever L is connected by an upright link M to the horizontal arm of an elbow-lever N, pivoted at *n* to a bracket O, projecting from the end of the car, the pivot being transverse and the arm moving longitudinally of the car and being located substantially in line with one side of the trap-door G in the walking-plank E of the car. The upper end of the vertical arm of the elbow-lever N is connected by a link P to the edge of said trap-door G at a point *p* a short distance from the hinge *g* of said door.

The operation of my invention may be described as follows: The normal position of the feed-trough being dumped, as shown in dotted lines in Fig. 2, and the trap-door being closed, and it being desired to water the stock, the trap-door G is raised to permit the entrance of water into the tank or receiver F.

This raising of the trap-door operates the whole train of mechanism in a manner easily understood from the foregoing description, and brings the trough H into an upright position, as shown in full lines, to receive the water. When the stock have been supplied, the trap is closed and the train of elbow-levers act in a reverse position, moving the trough on its pivot to dump outside the car anything which may remain in it. The trough H' on the opposite side of the car may be connected by a similar train of mechanism with the opposite side of the trap-door G, so that the troughs on both sides will be simultaneously operated by the opening and closing of the trap. The trap being placed in the walking-plank insures the closing thereof by the train-men in order to prevent accident to themselves, thus always keeping the troughs clean.

I have herein shown a preferred form of mechanism for connecting the troughs with the traps, as the object of my invention might be accomplished by the use of many and varied forms of such connecting mechanism, the prime object being, as stated, to so connect the traps and troughs that the opening of the trap will bring the troughs into upright position, and the closing thereof will dump the troughs.

The well-known water-tank may be used instead of the water-receiver F, if so desired.

The trap-door may be hinged otherwise than shown—for instance, so that it would open transversely instead of longitudinally of the car; or it might be hung upon a pivot and be swung around horizontally.

Instead of the elbow-levers and links shown, a system of gears and shafts might be used.

In Figs. 5 and 6 I have shown how the door G may be mounted to swing transversely upon a pivot set longitudinally of the car. In Fig. 5 two elbow-levers or bell-cranks are used, the opening of the door causing the depression of a bar $G^3$, which projects beyond the pivot or hinge, and the consequent operation of the connecting-rods and elbow-levers, in substantially the manner hereinbefore described. In Fig. 6 only one elbow-lever is used, the projecting rod $G^3$ being inclined downward, as shown.

In Fig. 7 the pivot of the door (marked S) is vertical and the door swung around horizontally. The pivot is continued below the door and bent to form a crank. When the door swings around horizontally, this crank, through its connecting-rod, actuates the bell-crank in substantially the same manner as the other arrangements of devices.

In Fig. 8 the gear-wheels are substituted for the elbow-levers shown in Fig. 5, and instead of plain connecting rods or bars rack-bars are used, the action and results being the same.

Such variations would not depart from the broad idea of my invention, which is, as stated, so connecting the trough or troughs and trap or traps that the operation of the one will operate the other at the same time.

Having thus fully described my invention, what I claim as new, and desire to secure by Letters Patent of the United States, is as follows:

1. A stock-car provided with a pivoted feed-trough, a water-tank, a trap-door covering said water-tank, and levers connecting the feed-trough with the trap-door, whereby closing and opening the trap-door will cause the trough to be dumped and righted, as set forth.

2. A stock-car provided with a pivoted feed-trough, a water-tank, a trap-door located in the walking-plank on the roof of the car for covering said tank, and levers connecting said trough and trap-door, whereby the operating of the trap-door dumps and rights the trough, as set forth.

3. A stock-car provided with a pivoted trough set to dump laterally of the car, a tank, a hinged trap-door in the walking-plank to cover said tank, set to open longitudinally of the car, and levers connecting the trough and trap-door, whereby the movement of the trap-door longitudinally of the car and in the act of opening and closing causes the trough to be tilted upward and downward laterally of the car, as set forth.

4. In a stock-car, the combination of the pivoted trough, the crank-arm secured thereto, the tank, the trap-door covering said tank, and the links and elbow-levers connecting said crank-arm with the trap-door, for the purposes set forth.

5. In a stock-car, the combination of the pivoted trough, the crank-arm secured thereto, the upright link, the elbow-lever pivoted to the end of the car, the link connecting them, the elbow-lever pivoted to move longitudinally of the car, the link connecting it with the aforesaid elbow-levers, the trap-door, and the link connecting the last-named elbow-lever with said door, for the purposes set forth.

In testimony whereof I affix my signature in presence of two witnesses.

GEO. D. BURTON.

Witnesses:
S. BRASHEARS,
M. J. FOOTE.